United States Patent [19]

Teetor

[11] Patent Number: 4,833,725

[45] Date of Patent: May 23, 1989

[54] UNINTENTIONAL RADIO TRANSMISSION DETECTION SYSTEM

[76] Inventor: Thomas S. Teetor, 5035 Chaucer Rd., Fort Wayne, Ind. 46835

[21] Appl. No.: 95,578

[22] Filed: Sep. 10, 1987

[51] Int. Cl.$^4$ .......................... H04B 17/00; H04B 1/44
[52] U.S. Cl. .......................................... 455/67; 455/88; 455/229; 455/98
[58] Field of Search ..................... 455/88, 296, 343, 9, 455/228, 229, 98, 67; 340/825.36, 825.71; 367/199

[56] References Cited

U.S. PATENT DOCUMENTS

| | | | |
|---|---|---|---|
| 2,280,421 | 1/1941 | Chappell et al. | 250/6 |
| 3,588,858 | 6/1971 | Demuth | 340/224 |
| 4,197,497 | 4/1980 | Phelps | 455/88 X |
| 4,331,953 | 5/1982 | Blevins et al. | 340/539 |
| 4,335,468 | 6/1982 | Foster et al. | 455/67 |
| 4,506,073 | 8/1986 | Moore | 455/88 X |
| 4,593,273 | 6/1986 | Narcisse | 455/88 X |

Primary Examiner—Robert L. Griffin
Assistant Examiner—Ralph E. Smith
Attorney, Agent, or Firm—Jeffers, Hoffman & Niewyk

[57] ABSTRACT

A system for detecting unintentional operation of a radio transmitter includes an antenna for receiving a r.f. signal and a detector for detecting the absence of presence of a component in the received signal that is indicative of a transmission from a radio transmitter keyed in an operating condition but not being used. In response to detection of such signal component, the detector produces a trigger signal. A delay timer times the duration of the trigger sigal and produces a delayed signal in response to the duration of the trigger signal exceeding a preset time period. An indication circuit produces an operator-alerting indication in response to receipt of the delayed signal informing the operator that the transmitter is unintentionally keyed in an "on" condition. The system also has a d.c. power source for supplying power to the detector, delay timer and indication circuit to operate the same. A power source voltage level monitor is coupled between the power source and the indication circuit for producing an actuating signal in response to depletion of the power source below a predetermined power level. The indication circuit is operable to produce another operator-alerting indication in response to receipt of the actuating signal informing the operator that the power supply is low. The system further includes a circuit for switching the power source between operative and inoperative conditions in response to detection of a rate of change in ambient background noise level exceeding respective positive and negative preset rates.

20 Claims, 1 Drawing Sheet

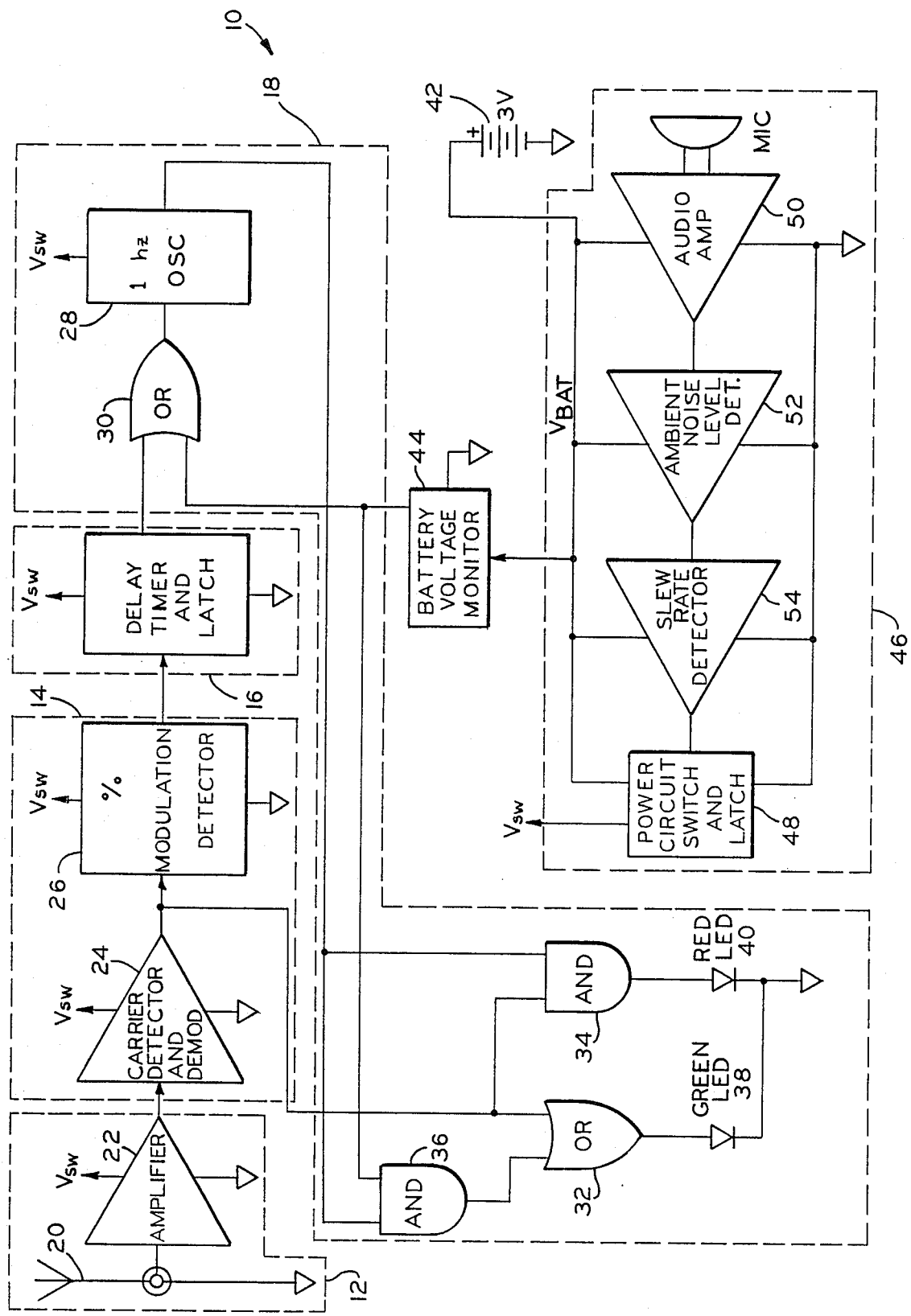

UNINTENTIONAL RADIO TRANSMISSION DETECTION SYSTEM

BACKGROUND OF THE INVENTION

1. Field of the Invention

The present invention generally relates to radio communication and, more particularly, is concerned with a system for detecting operation of a radio transmitter and providing an indication alerting the radio operator that the transmitter is unintentionally keyed in an "on" condition.

2. Description of the Prior Art

From airplanes, ships, boats, trucks, automobiles and the like, communication is often necessary by wa of two-way radio. Radio communication is the only means by which important information can be conveyed quickly so that actions whether routine or emergency in nature, based on such information an be carried out. Many users share use of the same frequency channels in carrying on such communication. It is important that these channels be maintained open for use to the maximum extent possible.

Many radio sets employ a microphone having a switch or button which is depressed whenever the operator desires to speak and transmit a message. Release of the button by the operator normally results in return of the button to its initial undepressed position. When the button is in its initial undepressed position, the radio is capable of receiving a message transmitted from a distant radio.

Serious problems can arise should the button become stuck in the depressed or keyed position, or a component fails, whereby the radio transmitter is maintained in its "on" or transmitting condition. First, the frequency channel being relied upon by many users will be unintentionally occupied by the stuck radio transmitter for an extended period of time which, in effect, blocks usage of the channel by anyone else. Second, since the transmitter of the radio is stuck in its transmitting condition, receipt of messages from others to inform the operator of the problem is also prevented.

Consequently, a need exists for means to detect the existence of a stuck button or component failure condition and to alert the radio operator so that appropriate corrective action can be taken promptly.

SUMMARY OF THE INVENTION

The present invention provides a radio transmission detection system designed to satisfy the aforementioned needs. The detection system of the present invention preferably incorporates several features which make it an overall reliable and discriminating aid for alerting the radio operator concerning the operating condition of the radio transmitter. However, the main feature of the system is the capability of detecting that the radio transmitter is transmitting when not intended and then producing an indication, such as a flashing light, that alerts the operator of this fact. Another feature of the invention is the capability of detecting that the radio transmitter is operating when intended and producing an indication, such as a steady light, that alerts the operator to this fact. Yet another feature of the invention is the capability of detecting that the voltage of the battery power supply is getting low an producing an indication, such as a flashing light, that alerts the operator to this fact. Still another feature is the capability of detecting a change in ambient noise level and in response thereto correspondingly automatically switching the system on or off.

Alternatively, the respective indications produced by the system could be various types of audible sounds in addition to or instead of various colored flashing and steady lights. Also, the system can be a separate stand-alone unit or integrated as part of a radio transmitter. The advantage of providing the system as a stand-alone unit is so that it can be used with already existing radio transmitters.

Accordingly, the present invention is directed to a system for detecting the unintentional operation of a radio transmitter and comprises: (a) means for receiving an r.f. signal; (b) means for producing a trigger signal in response to the received r.f. signal; (c) means for timing the duration of the trigger signal and producing a delayed signal in response to the duration exceeding a predetermined period of time; and (d) means for producing an operator alerting indication and response to the delayed signal. The system also included means for detecting the presence of a sinusoidal modulation component on the carrier and means for producing a non-trigger signal in response to detection of the sinusoidal modulation component. If a non-sinusoidal modulation component or irregular modulation component is detected, the trigger signal will be produced and timed and an alerting indication will be produced. The operator alerting indication produced in response to receipt of an unmodulated carrier, or a carrier modulated by a non-sinusoidal or irregular modulation component, will be, for example, a flashing red light.

Additionally, the system includes a d.c. power source for supplying power to the receiving means, detecting means, timing means and indication producing means for operating the same. The system has a power source voltage level monitor coupled between the power source and indication producing means for producing an actuating signal in response to depletion of the power source below a predetermined power level. The indication producing means is operable to produce another operator-alerting indication in response to receipt of the actuating signal. For instance, the operator-alerting indication produced in response to receipt of the actuating signal can be a flashing light.

Further, the system includes means for switching the power source between operative and inoperative conditions, means for receiving ambient background noise, and means for detecting the change and/or the rate of change in the level of the ambient background noise and producing a latch signal for switching the power supply from an inoperative to an operative condition in response to the detected rate of change exceeding a preset rate.

Still further, the detecting means of the system as operable to produce either the trigger signal in response to detection of the presence of a r.f. signal transmission from radio transmitter which is not in use or a non-trigger signal in response to detection of the presence of an above-defined signal component indicating transmission from a nearby navigational aid radio transmitter. Also, the indication producing means is coupled to the detecting means for receiving each of the trigger and non-trigger signals and is operable to produce still another operator-alerting indication in response to receipt of the trigger or non-trigger signal. The latter operator-alerting indication produced in response to receipt of either the trigger or non-trigger signal indicating operation of the transmitter is a steady green light.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWING

In the course of the following detailed description, reference will be made to the attached drawing in which the single FIGURE is a schematic diagram of the keyed microphone detection system of the present invention.

DETAILED DESCRIPTION OF THE INVENTION

Referring now to the single figure of the drawing, there is shown an exemplary embodiment of the keyed microphone detection system of the present invention, being generally designated 10. The detection system 10 is represented in schematic form since its components are well known in the art, and to reproduce them in detail would only serve to increase the complexity of the explanation of the system without adding to its clarity. As mentioned earlier, the detection system 10 can be provided as a stand-alone unit or incorporated as a part of a radio transmitter.

In its basic components, the detection system 10 for detecting unintentional operation of a radio transmitter includes receiving means 12, detecting means 14, timing means 16 and indication producing means 18. The receiving means 12 includes an antenna 20 for receiving a r.f. signal from a radio transmitter. Also, the system 10 may include a r.f. amplifier 22 to ensure adequate amplification of the received r.f. signal in those applications of the detection system 10, such as the cockpit of large jet transport aircraft, where the r.f. signal transmitted from the transmitter being monitored is at a low level due to the considerable distance of its transmitting antenna from the location of the receiving antenna 20 of the detection system 10. In light aircraft, the transmitting antenna is closer to the cockpit, so the transmitted r.f. signal is stronger and thus the amplifier 22 may not be needed.

By way of example, the amplifier 22 might be a low bias current bipolar transistor, such as a MRF9331, configured as a common emitter or common base tuned amplifier, with the current drain in the 100 microampere range. Preferably, the antenna 20 will be internal to the system 10; however, an optional extended range antenna connection may be provided.

The detecting means 14 of the detection system 10 is operable to detect the lack of a modulation signal component or components in the received r.f. signal that is indicative of unintentional transmission from the radio transmitter being monitored. In response to detection of an r.f. signal which is unmodulated, the detecting means 14 produces a trigger signal. More particularly, the detecting means 14 of the detection system may include a carrier detector and demodulator 24 and a modulation detector 26. The carrier detector and demodulator 24 detects the received (and, in some applications, amplified) r.f. signal, separating a low frequency component from a high frequency carrier in the received signal and producing an output representative of the low frequency component. Then the modulation detector 26 downstream of the carrier detector and demodulator 24 determines whether or not the output therefrom is a type of modulation indicative of transmission from a radio transmitter. If the detected signal is determined to be such non-modulation or non-sinusoidal modulation type, then a trigger signal is produced in response to such determination. Otherwise, a non-trigger signal is produced since normal operation of the transmitter is indicated.

As an example, the carrier detector and demodulator 24 can consist of a Schottky hot carrier diode, coupled with a band pass filter network to provide r.f. detection and demodulation. The low pass network passes frequencies ($-3$ db) between 30 and 150 hz, thereby providing an output which will be modulating components of the carrier. Likewise, propeller rotation modulating frequencies which may appear within this frequency band will also be present at the output if the carrier is turned on inadvertently, such as by unintentionally leaving the radio transmitter keyed in an "on" condition.

By way of example, the modulation detector 26 may consist of a dual peak detector, which detects both the positive and negative peaks of the incoming signal. The ratio of the detected peaks for incoming sinusoidal modulation will always be 1, which will not be the case for non-sinusoidal modulation. The peak detector outputs are therefore fed into a ratio amplifier whose output is compared to a hysteresis comparator set for a ratio of 1. In the event that the peak detector output is NOT 1, indicating either no modulation or non-sinusoidal modulation, the hysteresis comparator will latch its output, thereby producing a trigger signal and triggering the next stage, the timing means 16. However, if sinusoidal modulation is detected no trigger signal is produced. Thus, sinusoidal modulation which would be characteristic of navigational aids, instrument landing systems, etc., will not trigger the next stage nor, therefore, produce a false alarm. Alternatively, the precise modulation frequencies of 30, 90 and 150 Hertz could be detected.

The timing means 16 times the duration of the trigger signal and produces a delayed signal in response to the duration of the trigger signal exceeding a preset time period. The timing means 16 is preferably adjustable for setting a preset time period at a appropriate point within the range of twenty to ninety seconds, such as, for instance, at thirty seconds. In particular, the timing means 16 may be a delay timer and latch 16 which is only responsive to the trigger signal, measures the duration of the trigger signal, and produces a delayed signal in response to the trigger signal duration exceeding the preset time period.

When either irregular modulation (indicative of propeller or cabin background noise) or a virtually unmodulated carrier is present (such as is the case where the transmitter microphone is keyed but with virtually no audio component being present), the modulation detector 26 will produce a high level at its output. This high level will trigger the timing means 16. If the output remains high for longer than the preset time period, the output of the timing means 16 will latch and initiate operation of the indication producing means 18 to be described hereinbelow. As soon as the condition which causes the transmitter to be unintentionally keyed "on" is corrected (wherein the carrier is removed), the timing means 16 will return to the zero state and the indication producing means 18 will cease operating.

The indication producing means 18 of the detection system 10 produces an appropriate type of operator-alerting indication in response to receipt of the delayed signal informing the operator that the transmitter is unintentionally keyed in an "on" condition. For example, in some applications of the detection system 10, visible signalling devices such as colored lights are appropriate for alerting the operator. On the other hand, in other applications, different types of audible sounds might be more appropriate.

More particularly, the indication producing means 18 may take the form of a low frequency (1 hz) oscillator 28, OR gates 30, 32, AND gates 34,36 and green and red light emitting diodes (LEDs) 38, 40. The oscillator 28 may consist of a CMOS gateable a stable oscillator, set for a 1 hz or 2 hz operation, with a duty cycle of approximately 20% to conserve power when driving the LEDs. The frequency of oscillation may be changed by changing RC values within the astable oscillator. The gates may be of the CMOS type. The OR gate 30 is interposed between the delay timer and latch 16 and the low frequency oscillator 28 and the output of battery voltage monitor 44.

The OR gate 30 passes the delayed signal from the delay timer and latch 16 produced after expiration of the preset time delay. The low frequency oscillator 28 responds to the delayed signal by producing a 1 hz oscillating output signal. The green LED 38 will always be on whenever a carrier of sufficient strength and within the band pass of the system is detected. Such a situation will always occur whenever the transmitter being monitored is keyed "on". Therefore, a steady green light will inform the operator that the transmitter is operating.

Because turn-on of the red LED 40 is controlled by AND gate 34, the red LED will only flash on and off when the keyed transmitter microphone condition is detected, that being when the AND gate 34 receives the oscillating signal from both the low frequency oscillator 28 and an appropriate signal from the carrier detector and demodulator 24. The appropriate signal for opening the AND gate 34 is received from the carrier detector and demodulator 24 when either an unmodulated carrier is present due to the component failure condition or when irregular modulation, such as produced by noise and propeller frequency components, is present in the 15–180 hz range, such as can happen in a keyed microphone condition. The flashing of the red LED 40 will persist until the transmissions cease.

The detector system 10 also includes a d.c. power source in the form of the d.c. battery 42 for supplying operating power to the receiving means 12, detecting means 14, timing means 16 and indication producing means 18. A power source or battery voltage level monitor 44 is coupled between the battery 42 and the low frequency oscillator 28 of the indication producing means 18 circuit and produces an actuating signal in response to depletion of the battery 42 below a predetermined power level. The oscillator 28 is triggered via the OR gate 30 by the actuating signal from the monitor 44 to produce its oscillating signal. The actuating signal from the monitor 44 is also fed to the AND gate 36 to open the same and allow passage of the oscillating signal, causing flashing illumination of the green LED 38 at the 1 hz rate. Therefore, the oscillator 28 is triggered from either the timing means 16 or the low battery monitor 44. Also, the flashing green light informs the operator that the battery (or batteries) 42 is low and should b changed.

Finally, preferably the detection system 10 further includes a circuit 46 for switching the power of the battery 42 between operative and inoperative conditions in response to detection of a change or rate of change in ambient background noise level exceeding respective positive and negative preset rates. The respective levels of ambient background noise are indicative of operation or nonoperation of the vehicle with which the monitored radio transmitter and the detection system 10 are employed. For example, in use of the detection system 10 in an aircraft, the switching circuit 46 is operable to automatically turn on power from the battery 42. When the aircraft engine(s) is shut down, the switching circuit 46 automatically turns off power from the battery 42 to the rest of the system 10.

More particularly, the switching circuit 46 includes a power circuit switch and latch 48, a microphone and audio amplifier 50, ambient noise level detector 52 and a slew rate detector 54. The circuit switch and latch 48 is coupled to the battery 42 an is operable for switching the power from the battery 42 between operative and inoperative conditions. Along with the power circuit switch and latch 48, the microphone and audio amplifier 50, ambient noise level detector 52 and slew rate detector 54 are all independently connected directly to the battery 42 so that these components always receive operating power from the battery and are prepared to monitor ambient noise and cause operation of the switching circuit 46. The microphone and audio amplifier 50 is operable for receiving ambient background noise and producing an audio signal representative thereof. The ambient noise level detector 52 is connected to the microphone and audio amplifier 50 for converting the audio signal to a d.c. signal having a level proportional to the ambient background noise. The slew rate detector 54 is connected between the ambient noise level detector 52 and the power circuit switch and latch 48 for detecting the rate of change in the level of the d.c. signal. The slew rate detector 54 produces a latch signal for activating the power circuit switch and latch 48 to correspondingly switch the power from the battery 42 between inoperative and operative conditions in response to the detected rate of change in the d.c. signal level representing the ambient background noise exceeding respective positive and negative preset rates.

By way of example, the audio amplifier 50, ambient noise level detector 52 and slew rate detector 54 can be configured from low power quad Op Amp types such as the Intersil 7642 series or the National LM 346 series. In tee example referred to above of use of the detection system 10 on an aircraft, the output of the ambient noise level detector 52 will normally be at a low d.c. level when the aircraft is on the ground and not operational. When placed into operation, the ambient noise will rise rapidly from its background level, which is detected as a rate of change by the slew rate detector 54. The anticipated rate of change would be approximately 20 db in several seconds. Importantly, it is a rate of change which is detected and not an absolute noise level. When the rate of change exceeds the preset rate, the output of the slew rate detector 54 will set a latch of the power circuit switch and latch 48, thereby allowing battery power ($V_{BAT}$) to pass through a FET switch of the power circuit switch and latch 48 to the rest of the detection system 10. The switched power to the other system components is labelled as $V_{SW}$.

It should be understood, of course, that the operator alerting indication means may be audible means such as, for example, bells, horns or the like, which may be either operated intermittently or in continuous fashion to produce the desired indication of either an alarm or an indication that the radio frequency transmitter is operating properly.

It is believed that the detection system of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a exemplary embodiment thereof.

What is claimed is:

1. A system for detecting unintentional operation of a radio transmitter, said transmitter normally being used by an operator to transmit voice messages, said system comprising:
    (a) means for receiving a r.f. signal;
    (b) means for detecting the presence of a signal component in said received signal which is indicative of a transmission from a radio transmitter having a keying switch which is stuck in an operating condition, but wherein the transmitter is not being used to transmit voice messages from an operator and for producing a trigger signal in response to said detection of the presence of said signal component;
    (c) means for timing the duration of said trigger signal form the initial production thereof and for producing a delayed signal if the duration of said trigger signal exceeds a preset time period; and
    (d) means for producing an operator-alerting indication in response to receipt of said delayed signal.

2. The system as recited in claim 1, wherein said signal component is non-sinusoidal modulation.

3. The system as recited in claim 2, wherein said modulation component is an irregular modulation indicative of ambient background noise.

4. The system as recited in claim 1, wherein said signal component is a carrier unmodulated by an audio component.

5. The system as recited in claim 1, wherein said operator-alerting indication produced in response to receipt of said delayed signal is a flashing light.

6. The system as recited in claim 1, further comprising:
    a d.c. power source for supplying power to said receiving means, detecting means, timing means and indication producing means for operating the same; and
    a power source voltage level monitor coupled between said power source and said indication producing means for producing an actuating signal in response to depletion of said power source below a predetermined power level;
    said indication producing means being operable to produce a second operator-alerting indication in response to receipt of said actuating signal.

7. The system as recited in claim 6, wherein said another operator-alerting indication produced in response to receipt of said actuating signal is a flashing green light.

8. The system as recited in claim 1, further comprising:
    a d.c. power source for supplying operating power to said receiving means, detecting means, timing means and indication producing means;
    means for switching said power source between operative and inoperative conditions;
    means for receiving ambient background noise; and
    means for detecting the rate of change in the level of said ambient background noise and for producing a latch signal to switch said power supply from an inoperative to an operative condition in response to said detected rate of change exceeding a predetermined rate.

9. A system for detecting unintentional operation of a radio transmitter, said transmitter normally being used by an operator transmitting voice messages, said system to be placed in proximity of said radio transmitter and comprising:
    (a) means for receiving a r.f. signal transmitted by said radio transmitter;
    (b) means for producing a trigger signal in response to said received signal only when said received signal includes a non-sinusoidal signal modulation component, or no modulation component;
    (c) means for timing the duration of said trigger signal from the initial production thereof and for producing a delayed signal if the duration of said trigger signal exceeds a predetermined time period; and
    (d) means for producing an operator-alerting indication in response to said delayed signal for alerting the operator of said radio transmitter.

10. A system for detecting unintentional operation of a radio transmitter, said transmitter normally being used by an operator for transmitting voice messages, said system comprising:
    (a) means for receiving a r.f. signal;
    (b) means for producing a trigger signal in response to said received signal only when said received signal includes a non-sinusoidal signal modulation component, or no modulation component;
    (c) means for timing the duration of said trigger signal from the initial production thereof and for producing a delayed signal if the duration of the trigger signal exceeds a predetermined time period; and
    (d) means for producing an operator-alerting indication in response to said delayed signal;
    (e) means for detecting the presence of a sinusoidal modulation component in said received signal;
    (f) means for producing a non-trigger signal in response to detection of such sinusoidal modulation component; and
    (g) indicator responsive means coupled to said detecting means for receiving said trigger and non-trigger signals and being operable to produce another operator alerting indication in response to receipt of said trigger or non-trigger signal.

11. The system as recited in claim 10 wherein said another operator-alerting indicator produced in response to said receipt of said trigger or non-trigger signal is a steady light.

12. The system as recited in claim 11, wherein said detecting means includes:
    a carrier detector and demodulator for detecting said r.f. signal, separating a low frequency component from a high frequency carrier in said received signal and producing an output representative of said low frequency component; and a modulation detector for determining whether said output from said carrier detector and demodulator is a type of modulation indicative of an inadvertent transmission from a radio transmitter keyed in an operating condition, but not being used for transmitting voice messages from an operator and producing said trigger signal in response to determining that said output is said type of modulation and said non-trigger signal in response to determining that said output is not said type of modulation.

13. The system as recited in claim 12, wherein said timing means includes a delay timer and latch which is non-responsive to said non-trigger signal and which is responsive to said trigger signal for timing of the duration of said trigger signal and producing a delayed signal in response to said duration of said trigger signal exceeding a preset time period.

14. The system as recited in claim 13, wherein said indication producing means includes:
   a low frequency oscillator responsive to said delayed signal for producing an oscillating output signal; and
   a light emitting diode (LED) for producing said operator-alerting indication in the form of a flashing light of a first color in response to receipt of said oscillating output signal.

15. The system as recited in claim 14, wherein said first color is red.

16. The system as recited in claim 13, further comprising:
   a d.c. battery for supplying operating power to said carrier detector and demodulator, said modulation detector, said delay timer and latch, and said low frequency oscillator;
   a battery voltage level monitor coupled between said battery and said oscillator for producing an actuating signal in response to depletion of said battery below a predetermined power level:
   said oscillator being operable to produce said oscillating output signal also in response to receipt of said actuating signal; and
   said indication producing means also including another light emitting diode (LED) being coupled to said oscillator and to said battery voltage level monitor for producing another operator-alerting indication in the form of a flashing light of a second color in response to receipt of said oscillating output signal and said actuating signal.

17. The system as recited in claim 16, wherein said second color is green.

18. The system as recited in claim 16, further comprising:
   a power circuit switch and latch coupled to said battery and being operable for switching the power from said battery between operative and inoperative conditions;
   a microphone and audio amplifier connected to said battery and being operable for receiving ambient background noise and producing an audio signal representative thereof;
   an ambient noise level detector connected to said microphone and audio amplifier for converting said audio signal to a d.c. signal having a level proportional to said ambient background noise;
   a slew rate detector connected between said ambient noise level detector and said power circuit switch and a latch for detecting the rate of change in the level of said d.c. signal and producing a latch signal for activating said power circuit switch and latch to correspondingly switch said power from said battery between said inoperative and operative conditions in response to said detected rate of change in said d.c. signal level representing said ambient background noise exceeding respective positive and negative preset rates.

19. The system as recited in claim 12, wherein:
   said indication producing means also includes another light emitting diode (LED) being coupled to said carrier detector and demodulator for producing another operator-alerting indication in the form of a steady light of a second color in response to receipt of said output from said carrier detector and demodulator being representative of said low frequency component of said received signal.

20. The system as recited in claim 19, wherein said second color is green.

* * * * *

UNITED STATES PATENT AND TRADEMARK OFFICE
CERTIFICATE OF CORRECTION

PATENT NO. : 4,833,725
DATED : May 23, 1989
INVENTOR(S) : Thomas S. Teetor

It is certified that error appears in the above-identified patent and that said Letters Patent is hereby corrected as shown below:

```
In the Abstract, line 3, change "of" to --or--;
Col. 1, line 15, change "wa" to --way--;
Col. 1, line 65, change "an", first occurrence, to --and--;
Col. 5, line 15, change "a stable" to --astable--;
Col. 6, line 22, change "an" to --and--;
Col. 6, line 54, change "tee" to --the--;
Claim 1, Col. 7, line 34, change "form" to --from--;
Claim 9, Col. 8, line 17, after "operator" insert --for--;
Claim 11, Col. 8, line 59, change "indicator" to --indication--.
```

Signed and Sealed this

Twenty-third Day of January, 1990

*Attest:*

JEFFREY M. SAMUELS

*Attesting Officer*    *Acting Commissioner of Patents and Trademarks*